US012721325B2

(12) United States Patent
Lindenmoyer et al.

(10) Patent No.: US 12,721,325 B2
(45) **Date of Patent: *Sep. 1, 2026**

(54) PERISTALTIC METERING PUMP AND METHODS OF OPERATION

(71) Applicant: EcoTech, LLC, Bethlehem, PA (US)

(72) Inventors: Mark Lindenmoyer, Coopersburg, PA (US); Timothy Marks, Northampton, PA (US); Christian Clough, Bethlehem, PA (US); Patrick Clasen, Allentown, PA (US); Justin Lawyer, Bethlehem, PA (US)

(73) Assignee: ECOTECH, LLC, Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/885,895

(22) Filed: Sep. 16, 2024

(65) Prior Publication Data

US 2025/0000068 A1 Jan. 2, 2025

Related U.S. Application Data

(60) Continuation of application No. 17/977,502, filed on Oct. 31, 2022, now Pat. No. 12,089,573, which is a division of application No. 17/140,511, filed on Jan. 4, 2021, now Pat. No. 11,484,016.

(60) Provisional application No. 62/956,984, filed on Jan. 3, 2020.

(51) Int. Cl.

| | |
|---|---|
| ***A01K 63/04*** | (2006.01) |
| ***F04B 17/03*** | (2006.01) |
| ***F04B 43/12*** | (2006.01) |
| ***F04B 49/06*** | (2006.01) |

(52) U.S. Cl.

CPC ........ *A01K 63/047* (2013.01); *F04B 43/1253* (2013.01); *F04B 49/06* (2013.01); *F04B 17/03* (2013.01)

(58) Field of Classification Search

CPC ....... A61K 63/047; F04B 17/03; F04B 43/08; F04B 43/09; F04B 43/1253; F04B 49/065

See application file for complete search history.

(56) References Cited

U.S. PATENT DOCUMENTS

| | | | | |
|---|---|---|---|---|
| 4,976,590 | A | 12/1990 | Baldwin | |
| 5,024,347 | A | 6/1991 | Baldwin | |
| 11,484,016 | B2 * | 11/2022 | Lindenmoyer | A01K 63/047 |
| 12,089,573 | B2 * | 9/2024 | Lindenmoyer | F04B 43/1253 |

(Continued)

FOREIGN PATENT DOCUMENTS

| | | | |
|---|---|---|---|
| EP | 0745400 | A2 | 12/1996 |
| WO | 2018078059 | A1 | 5/2018 |

OTHER PUBLICATIONS

International Search Report Dated Feb. 25, 2021 from Corresponding PCT Application No. PCT/US2021/012055.

*Primary Examiner* — Philip E Stimpert

(74) *Attorney, Agent, or Firm* — CALDERON SAFRAN & WRIGHT P.C.

(57) ABSTRACT

A peristaltic pump is provided for conveying a fluid pumping medium through a compressible hose. The pump is designed particularly for use in an aquarium, terrarium, or vivarium for metering fluids accurately and reliably by eliminating permanent tubing deformation and random stopping positions of rollers.

20 Claims, 4 Drawing Sheets

(56) References Cited

U.S. PATENT DOCUMENTS

| | | | | |
|---|---|---|---|---|
| 2005/0047925 | A1 * | 3/2005 | Davis | F04B 43/1253 417/53 |
| 2005/0180856 | A1 | 8/2005 | Bach | |
| 2018/0363638 | A1 | 12/2018 | Holzhausen | |
| 2019/0136853 | A1 * | 5/2019 | Bach | F04B 49/22 |

* cited by examiner

PERISTALTIC METERING PUMP AND METHODS OF OPERATION

CROSS-REFERENCE TO RELATED APPLICATIONS AND CLAIM TO PRIORITY

This application is a continuation of U.S. patent application Ser. No. 17/977,502, filed Oct. 31, 2022, now U.S. Pat. No. 12,089,573, which is a divisional of U.S. patent application Ser. No. 17/140,511, filed Jan. 4, 2021, now U.S. Pat. No. 11,484,016, which claims the priority of U.S. Provisional Patent Application No. 62/956,984, filed Jan. 3, 2020, which is incorporated herein by reference.

FIELD OF THE INVENTION

The present invention relates generally to fluid pumps and, more specifically, to peristaltic pumps for conveying a fluid pumping medium through a compressible hose, particularly for use in an aquarium, terrarium, or vivarium, and methods of operating the pump.

BACKGROUND OF THE INVENTION

Peristaltic metering pumps are a well-developed technology in the science and medical fields, with very high accuracy and repeatability standard. A peristaltic metering pump is a type of positive displacement pump, wherein fluid is metered through a flexible tube (or tubing) in a peristaltic motion (i.e., supplied or pumped in a measured or regulated amount).

A peristaltic roller pump typically comprises a flexible tube of fixed length within a housing of the pump, which tube is deformable and displaces liquid via peristalsis as one or more rollers pass along the length of the deformable tube. The rollers are attached to a rotor that is controlled by an electric motor. As the rotor turns, the rollers pinch the tube to force the fluid through towards an outlet. When the tube is not compressed, the fluid is drawn into the tube through an inlet. The amount of displaced liquid is a constant volume per unit of revolution of the rollers. For technological reasons, the amount of liquid peristaltically displaced through the tube can vary.

Peristaltic roller pumps are generally used whenever the pump environment requires that the pump mechanism not contact the fluid to be pumped. Such pumps are widely used in the areas of research and medicine, for example for pumping blood and other fluids wherein it is desired to maintain the blood or fluid in a sterile environment without the possibility of contamination from the pump mechanism. Peristaltic metering pumps also excel at pumping dirty fluids that contain particulate matter into lower pressure systems because they have no check valves to clog. The gentle forces created during the peristaltic pumping action do not damage delicate liquids within the tube.

In the aquarium field, peristaltic metering pumps have been used for years as well, but due to cost and design constraints, there have been many tradeoffs in accuracy and features to compete in this cost sensitive market.

While the art of designing and building peristaltic roller pumps has been relatively well developed over the years, problems associated with pump surge, undue complexity, and entanglement or kinking of the flexible tubing still persist. Thus, while known peristaltic metering pumps have proven to be acceptable for various applications, such pumps are nevertheless susceptible to improvements that may enhance their performance and cost. effectiveness Therefore, there exists a need to develop improved peristaltic metering pumps, particularly for use in an aquarium, terrarium, or vivarium.

SUMMARY OF THE INVENTION

An object of the invention is to provide fluid pumps, more specifically to peristaltic pumps, for conveying a fluid pumping medium through a compressible tube. The pumps are useful in metering liquids, particularly for use in an aquarium, terrarium, or vivarium. To minimize inaccuracy of the pump due to permanent deformation of the compressible tube, the pump is configured to stop at a fixed position. When stopped outside of that fixed position, the pump reverses its cycle to return the pump it the fixed position.

Another object of the invention provides an aquarium, terrarium or vivarium containing the peristaltic pump for metering liquids in the aquarium, terrarium, or vivarium. Methods for making and using the different aspects of the present invention are also provided. A method of operating a pump comprises the steps of providing a peristaltic pump having the rollers located at fixed positions. Pumping a liquid by activating the motor. Stopping the motor, and thereafter causing the controller to reverse the pump until the rollers are in the fixed positions and memorize number of micro-steps the motor ran in reverse.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF PREFERRED EMBODIMENTS

Figure 1:
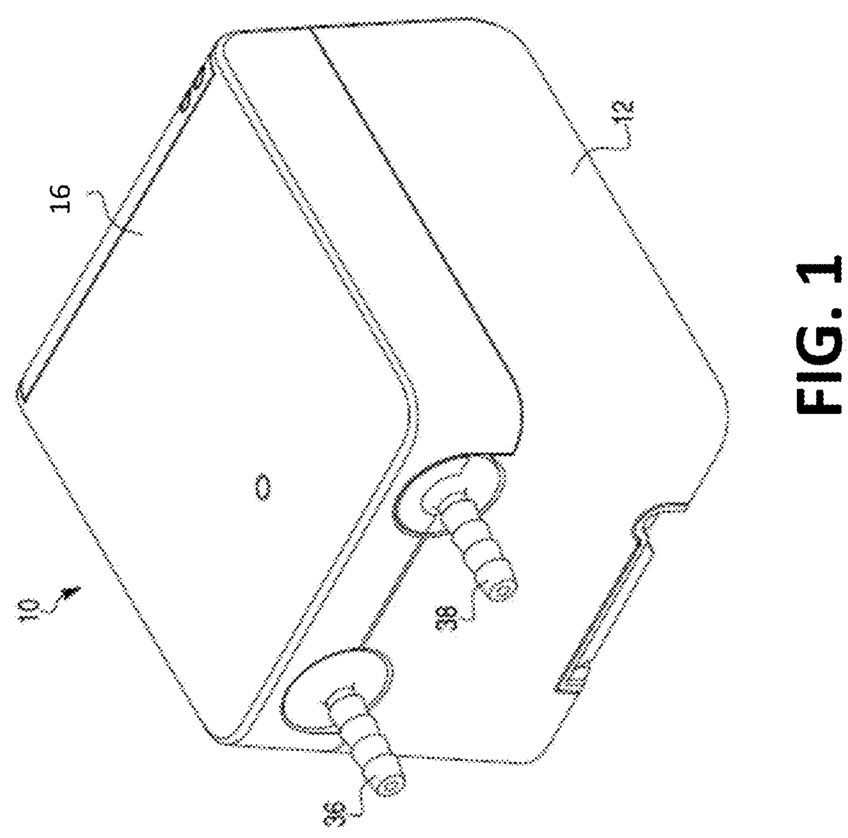
FIG. 1 is a perspective view of a peristaltic metering pump according to an exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiment(s) is intended to be read in connection with the accompanying drawings, which are to be considered part of the entire written description. In the description, relative terms such as "horizontal," "vertical," "up," "down," "upper", "lower", "right", "left", "top" and "bottom", "front" and "rear", "inwardly" and "outwardly" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. The words "smaller" and "larger" refer to relative size of elements of the apparatus of the present invention and designated portions thereof. Additionally, the word "a" and "an" as used in the claims means "at least one" and the word "two" as used in the claims means "at least two".

Figure 2:
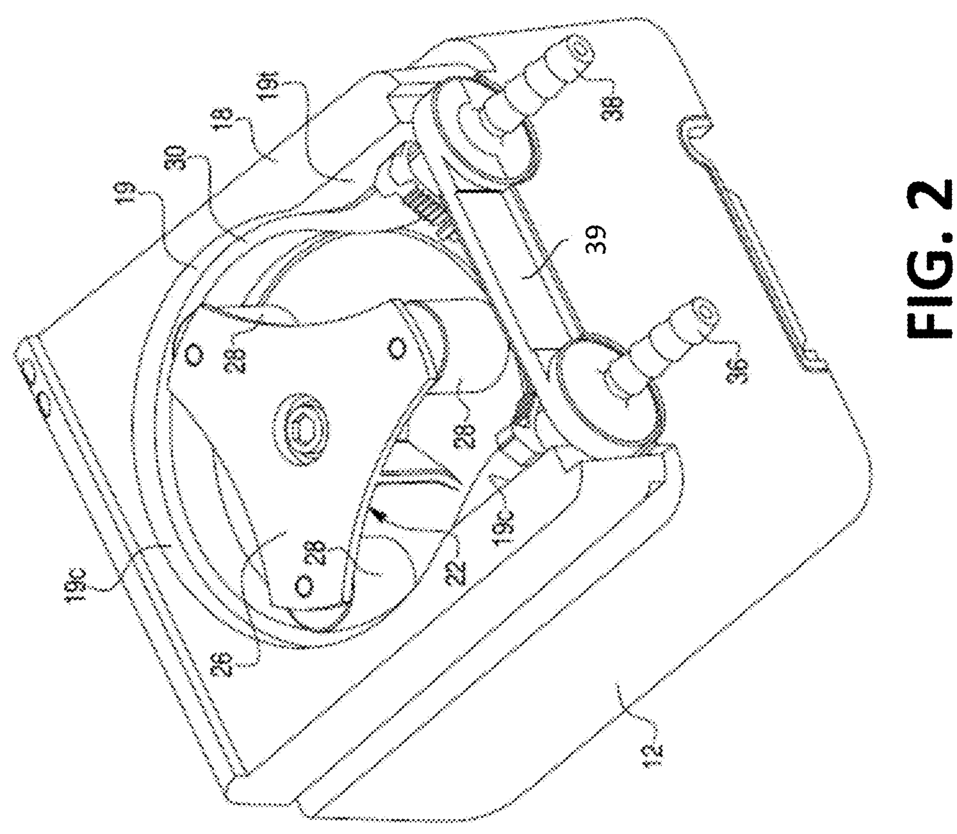
FIG. 2 is a perspective view of the peristaltic metering pump according to the exemplary embodiment of the present invention without a hood.

FIGS. 1 and 2 depict a peristaltic metering pump 10 according to an exemplary embodiment of the present invention. The peristaltic metering pump 10 is particularly useful for non-medical environments, and especially for aquarium, vivarium, and terrarium applications. More specifically, the peristaltic metering pump 10 meters any liquid that would be relevant for an aquarium, terrarium, vivarium, or hydroponic system. Preferably, an aquarium includes a container and the metering pump connected to the container for metering liquids into and out of the container for being supplied to the aquarium. The liquid may be water, salt solutions, or any other liquid necessary for the aquarium, terrarium, vivarium, or hydroponic system. Moreover specifically, the peristaltic metering pump 10 is provided to meter at least one of the following liquids:

a. mineral supplement solutions for calcium, alkalinity, magnesium, and trace elements to make up for metabolic consumption;
b. lanthanum chloride to precipitate phosphates, plant fertilizers, etc.;
c. freshwater for evaporation makeup; and
d. liquid foods, such as planktonic algae or other foods for aquatic inhabitants.

The peristaltic metering pump 10 is also adapted to remove "old" seawater from the aquarium and using a second pump or an arrangement of valves to add "new" water for a water change, which is a common method to remove excessive nutrients from the water column.

The peristaltic metering pump 10 comprises a casing 12 fixed (i.e., non-movably secured) to a base member 14 by threaded fasteners 15 (best shown in FIGS. 3A and 3B), and a cover (or hood, best shown in FIG. 1) 16. Preferably, the cover 16 is slidable relative to the casing 12 to allow for access the interior of the casing by sliding the cover 16 away from the casing 12. When the cover 16 is mounted on the casing 12, the two components form the outer housing of the pump 10. The peristaltic metering pump 10 further comprises a pump stator 18 fixed to a support member 20, and a pump rotor 22 mounted within the stator 18 and rotatable about an axis. The pump stator 18 is fixed to the support member 20 by threaded fasteners 21. In turn, the support member 20 is fixed to the base member 14 by threaded fasteners 17, such as screws (best shown in FIGS. 3A and 3B). The pump stator 18 has an internal surface 19 including a circular portion 19*c* (preferably, at least half of a circle) and two straight portions 19*t* leading to the circular portion 19*c*.

Figure 3A:
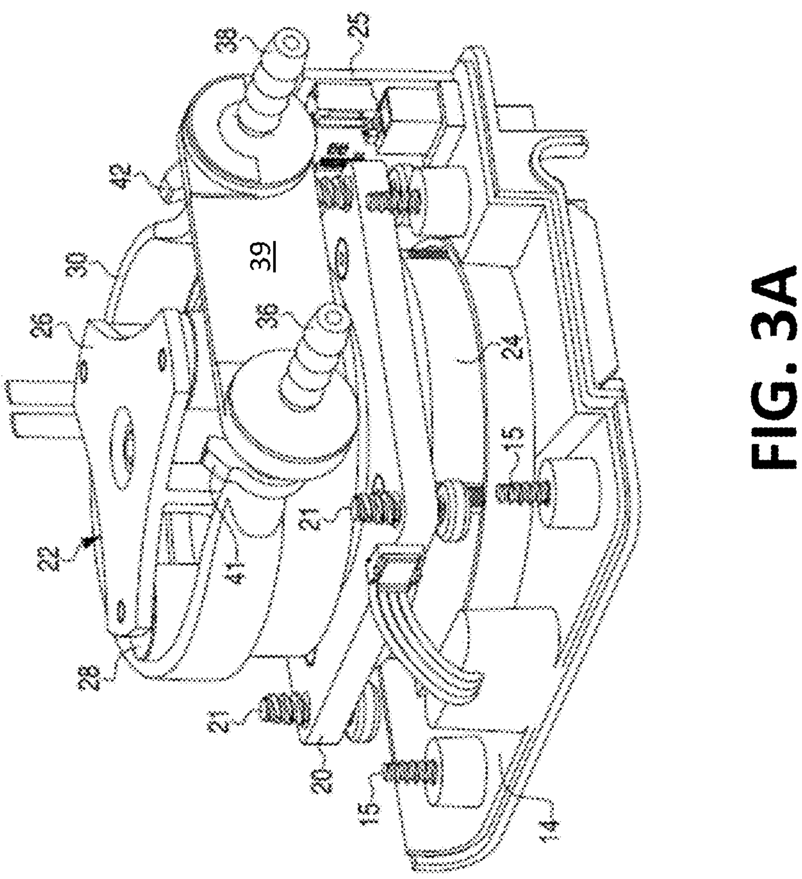
FIGS. 3A and 3B are perspective views of the peristaltic metering pump according to the exemplary embodiment of the present invention without the hood and casing.

The pump rotor 22 is rotatably driven by an electric rotary stepper motor 24, which is mounted on the support member 20, as best shown in FIG. 3A. Thus, the pump rotor 22 is configured to be rotatable relative to the pump stator 18. The peristaltic metering pump 10 further comprises a motor controller 25 for controlling operation of the electric rotary stepper motor 24. The pump rotor 22 includes a roller carrier 26 carrying two or more, preferably three, cylindrical rollers 28 rotatably mounted to the roller carrier 26. The roller carrier 26 is preferably a flat plate whose center is fixed on the motor shaft of the stepper motor 24 and is rotatably driven by the stepper motor 24. The rollers 28 are cylindrical in shape and equiangularly mounted on the periphery of the roller carrier 26. The center axis of each of the rollers 28 is preferably perpendicular to the plane of the roller carrier 26 and/or parallel to the motor shaft. Each of the rollers 28 is rotatable about its axis, and the axes of the rollers 28 extend in parallel. Thus, the cylindrical rollers 28 are rotatable relative to the stator 18 and the roller carrier 26. The rollers 28 have a length substantially equal to the height of the stator 18. Moreover, the rollers 28 travel in a circular path about a rotational axis of the pump rotor 22, when the stepper motor 24 is activated. The cover 16, pivotally mounted to the pump stator 18 or the casing 12, covers the pump rotor 22 and the circular portion 19*c* of the internal surface 19 of the pump stator 18.

The stepper motor 24 is preferably a brushless DC electric motor characterized by a discrete number of steps during a rotation. Specifically, the stepper motor 24 divides a full rotation into a number of equal steps. The position of the rotor of the stepper motor 24 can be commanded to move and hold at any one of these steps without any position sensor for feedback (an open-loop controller), as long as the motor 24 is sized to the application in respect to torque and speed. In other words, the stepper motor 24 may be held at any certain step without the need for any feedback, resulting in a precisely controlled pump.

The peristaltic metering pump 10 further comprises a flexible tube (or tubing) 30 having an inlet end 32 and an outlet end 34. The flexible tube 30 is disposed within the stator 18 between the internal surface 19 of the pump stator 18 and the pump rotor 22, as best shown in FIG. 2, so that at least one of the cylindrical rollers 28 of the pump rotor 22 is in contact with and thereby compresses the flexible tube 30 between one of the cylindrical rollers 28 and the internal surface 19. Thus, the flexible tube 30 is disposed within the pump stator 18 around the pump rotor 22 and is squeezed flat between at least one of the rollers 28 and the internal surface 19 of the pump stator at all times. The tubing 30 may be made of a soft resilient material, such as polyvinyl chloride, silicone rubber, fluoropolymer, thermoplastic, fluoroelastomer, or combinations thereof. As the cylindrical rollers 28 rotate with the pump rotor 22, they move the liquid contained in the flexible tubing 30 in the direction of rotation. The circular portion 19*c* of the internal surface 19 of the pump stator 18 defines the circular path of travel of the rollers 28 when in an operating position shown in FIG. 2.

Figure 3B:
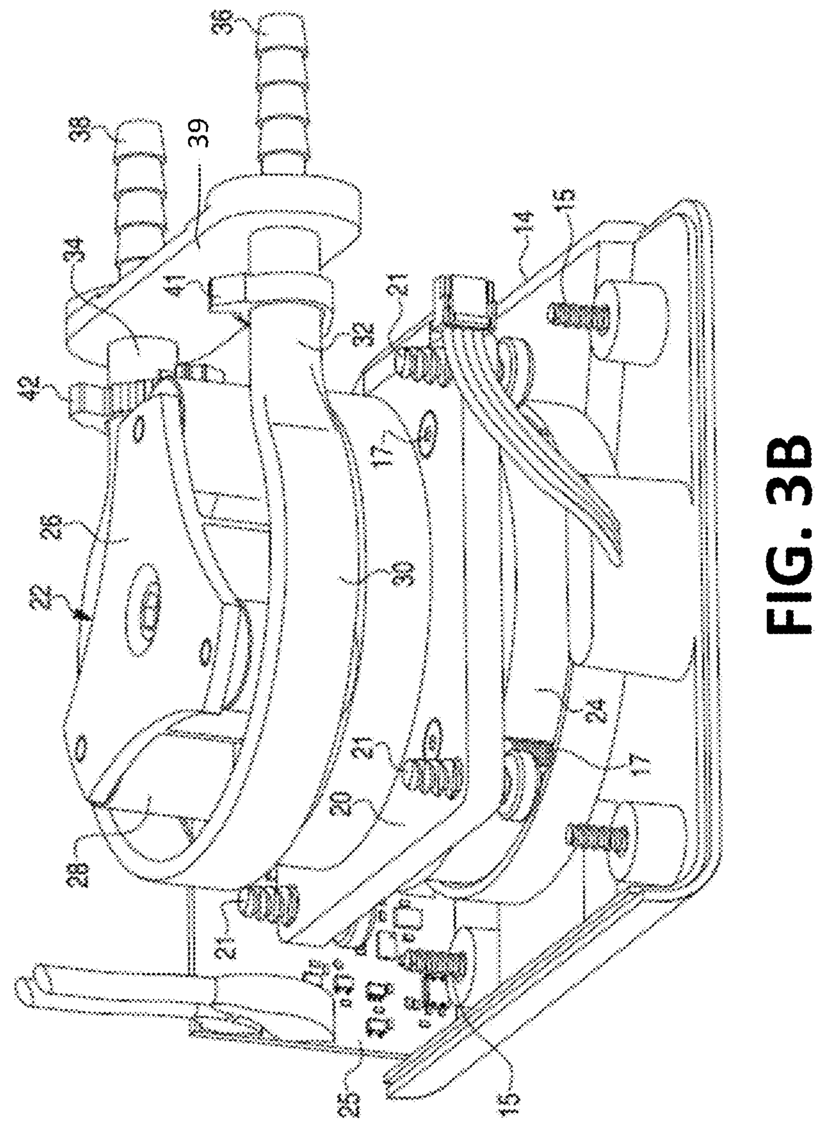

Moreover, the peristaltic metering pump 10 comprises an inlet fitting (or port) 36 and an outlet fitting (or port) 38. As best illustrated in FIG. 3B, the inlet end 32 of the flexible tube 30 is attached to the inlet fitting 36, while the outlet end 34 of the flexible tube 30 is attached to the outlet fitting 38. Preferably, the inlet and outlet fittings 36 and 38, respectively, are integrally connected to one another by a connecting plate 39. As best illustrated in FIG. 2, the inlet and outlet fittings 36 and 38 are mounted on the casing 12 and are retained between the casing 12 and the cover 16. Preferably, clips 41 and 42 secure the inlet and outlet ends 32 and 34 of the flexible tube 30 to the inlet and outlet fittings 36 and 38, respectively.

In operation, when the electric stepper motor 24 is activated and rotates the rotor 22, the cylindrical rollers 28 of the rotor 22 rotate about the axis of the rotor 22 and about their own axes, and compress the tube 30 inside the pump stator 18 of the peristaltic metering pump 10 (the tube 30 is compressed between least one of the rollers 28 and the internal surface 19). The compression of the flexible tube 30 forces the non-compressible liquid therein to move through the flexible tube 30 as the rollers 28 rotate inside the pump stator 18. Therefore, the flexible tube 30 inside the pump stator 18 undergoes repeated compression and expansion while pumping the liquid. For example, in FIG. 2, the pump rotor 22 rotates in a clockwise direction to move the liquid from the inlet fitting 36 to the outlet fitting 38.

During repeated compression and expansion cycles of the tube 30, the flexible tube 30 deforms uniformly along its entire length. When the peristaltic metering pump 10 stops rotating though, the point(s) at which the rollers 28 stop on the flexible tube 30 are held in a compressed state, causing longer lasting, permanent deformation to the flexible tube 30. Deformation of the flexible tube 30 causes an internal volume change of the flexible tube 30, which alters the volume of liquid that is metered (or dosed) out of the pump 10 in subsequent actions.

To aggravate this situation, depending on the volume of liquid being metered in each repeated compression/expansion cycle, the pump rotor 22 has random stop positions on the flexible tube 30 for every metering (or dosing) action. Repeated start/stop events cause deformation of the flexible tube 30 along the entire length of the circular portion 19*c* of the internal surface 19 of the pump stator 18 with various different magnitudes of deformation of the flexible tube 30, depending on time stopped in a position, time since stoppage, and other factors, such as whether the stoppage point is in close proximity to a previous deformation. This is not typically a problem in the medical or science fields since tubing in the peristaltic medical pump is replaced often in order to eliminate cross contamination. However, in aquarium, vivarium and terrarium applications, the flexible tube 30 is not expected to be replaced (at least not frequently). Not accounting for this deformation can cause inaccuracy and repeatability problems, particularly where precise control over the liquid is necessary.

There exist flexible tube material formulations that deform less during extended operation of peristaltic pumps and thus exhibit less memory of deformation. Those formulations require more force to compress the tube, necessitating a larger operating force and therefore a larger motor at increased cost. A flexible tube is generally more resistant to change and tends to have a lower lifetime of operation before the tube tears or splits due to repeated deformation. A softer tubing would have a longer lifetime before tearing, but the softer tubing stretches and deforms more readily. As noted, permanent deformation equates to a volumetric change and distorts the predictable volume during peristalsis.

In order to resolve the above-mentioned problem, the peristaltic metering pump 10 implements a fixed (or constant, invariable, same) parking position (or a single stop point) of the rollers 28 of the pump rotor 22. As such, the rollers 28, in their parked positions, always contact the same portion of the tubing 30, which as a consequence becomes deformed. For example, in an embodiment with three rollers 28, the rollers 28 are separated by 120 degrees, so that there are three possible parked positions. When stopped, it is desirable that a roller 28 occupy the same position every time, and it does not matter which roller 28 is in contact with the deformed portion of the tubing 30, just as long as one roller 28 is in that position. As such any one of the three possible positions is appropriate. Preferably, the position that requires the least amount of motor reversing is effected by the controller of the motor of pump 10. Deformation of the flexible tube 30 can be accounted for, such as through calculations and calibration, so long as the deformation of the flexible tube 30 is limited to a known position or multiple known positions on the flexible tube 30 and is not random. It is not possible to ensure a single stop point after dosing since the liquid dosing (or metering) action can be for any specific volume given. After the dosing action is complete, the peristaltic metering pump 10 therefore reverses direction to rotate backwards to the fixed parking position(s) in increments of 360° divided by the number of rollers 28. For example, for three rollers 28 according to the exemplary embodiment of the present invention, the increment is 120°. Rotor 22 rotates to a position so that each of the rollers 28 is always parked in the same position of 0°, 120°, 240° degrees. The goal of parking the rollers at fixed points on the tubing 30 eliminates random tubing deformation to allow more accurate and precise volumetric dosing. Therefore, the actual position of the rollers 28 relative to the stator 18 does not matter as long as the same portion of the tubing 30 is deformed when the pump 10 and the rotor 22 are in the park position. In preferred embodiment, two rollers 28 are parked on the tubing 30, thus creating two fixed deformation points in the tubing 30. Having two rollers 28 compressing the tubing 30 allows for higher backflow pressure holding, but does not have an impact on the goal of parking the rollers 28 to improve accuracy. If there were more or fewer rollers than three, then there might be more or fewer rollers parked in fixed tubing positions, but the intention is to always park them in the same position(s) on the tubing to create a consistent deformation rather than random deformation.

Because the peristaltic metering pump 10 uses the stepper motor 24 for rotating the pump rotor 22, the location of each of the rollers 28 can easily be determined based upon the number of steps rotated during dosing. Thus, the number of steps to be moved in reverse can be determined and saved, because those steps will not dose liquid during the next dosing action. This feature may not be beneficial in the medical or scientific fields, since reverse operation can lead to creating a vacuum and/or reverse pull of dosed liquids. However, in the aquarium, vivarium and terrarium applications for which the pump 10 is particularly useful, this reverse action is acceptable and is even beneficial. One benefit of reverse operation of rotor 22 at the end of the dosing action is improved dosing accuracy. Moreover, this reverse action creates a vacuum that pulls liquid back into the outlet end 34 of the flexible tube 30, thus reducing evaporation at the outlet end 34 of the flexible tube 30, which can cause blockages when the chemical dissolved in the additive solution forms a precipitate after evaporation. Typically, the outlet of the tubing 30 is not submerged in water, and is suspended over or in the aquarium, vivarium or terrarium and allowed to drip or flow into the aquarium, vivarium or terrarium. In that situation, when the pump 10 is stopped, liquid is present throughout the tubing 30 to the outlet port 38. As noted above, the liquid at the outlet port 38 can evaporate, which in the case of a solution or suspension liquid, can leave dissolved or suspended solids at the outlet port 38 leading to clogging of the tubing 30 or decreased flow area. Clogging or decreased flow area can lead to inaccuracies in the dosing calculation of the pump. By drawing the liquid back from the outlet port 38 during the parking operation, evaporation is minimized due to less liquid contact with air and/or air convection.

The volume of liquid dosed during one rotation of the pump rotor 22 of the peristaltic pump 10 is not linear. The flexible tube 30 has the following regions: an initial region when each of the rollers 28 is first making contact and starts to compress the flexible tube 30, a constant flow rate (or dosing) region, and an end (or non-dosing) region when each of the rollers 28 moves off the flexible tube 30. In the initial region, the output flow rate of the peristaltic pump 10 is slow but increasing. In the constant flow rate region, the output flow rate of the peristaltic pump 10 is constant. In the end region, there is no output flow through the peristaltic pump 10 with a slight pressure drop.

In order to dispense or dose a specific volume of liquid, there will be random start and stop positions which can begin or end in either dosing or non-dosing regions during rotation of the pump rotor 22. Many existing inexpensive metering pumps use time-based calculations to determine how long to run the metering pump to dispense specified volumes of liquid based upon the assumed flowrate in volume per second, and others use the number of rotations from a known fixed start or stop position. These existing methods do not factor in the regions of rotation that do not dispense liquid, which leads to less accurate and less repeatable dosing actions.

The peristaltic metering pump 10, by using a stepper motor 24, rotates in discrete micro-steps, or fractions of a revolution. Micro-stepping is a method of controlling stepper motors, typically used to achieve high resolution or smoother motion at low speeds. Specifically, micro-stepping is a way of moving the stator flux of a stepper motor more smoothly than in full- or half-step drive modes. Micro-stepping control divides each full step into equal sized smaller steps to help smooth out rotation of the stepper motor, especially at slow speeds. This results in less vibration, and makes noiseless stepping possible down to 0 Hz. It also makes smaller step angles and better positioning possible. While a stepper motor is limited by the known number of discrete steps per revolution, a micro-stepping enabled motor controller allows the motor to move in fractions of a step. A micro-step is generally defined as splitting a single step into multiple smaller steps. This is accomplished by controlling the current in each stepper motor phase, which can effectively produce multiple partial steps within a single step, for thereby increasing the dispenser resolution.

Consequently, to increase accuracy and repeatability, the peristaltic metering pump 10 preferably uses a gearing system so that the each complete roller rotation includes 256,000 micro-steps per rotation of the stepper motor 24 for positional accuracy throughout the rotation of the pump rotor 22, including those regions with no flow rate. Although 256,000 micro-steps are preferred for high accuracy at a reasonable cost, other numbers of micro-steps are also appropriate for the invention. The motor controller 25, which has software and/or firmware for assuring operation, includes a first flow rate lookup table storing a plurality of preset values of amount (such as volume) of liquid dispensed per micro-step for each starting angular position of the stepper motor 24 throughout one 360° rotation of the pump rotor 22. The first lookup table correlates angular position and volume per unit time to the number of steps of the motor 24, and is determined by measuring the flow rate at the various rotational angles of the rollers 28 on the stator. It was found that flow rate varies and even stops at different rotational angles and the first lookup table compensates for this variance. This first lookup table provides the number of steps required to provide a given volume at a given angular position of the stepper motor 24, and is fixed for the pump 10. The first lookup table is stored in the controller 25, and is used by the controller 25 to calculate the number of micro-steps required from the last random stop position for every dosing action.

A calibration factor may also be calibrated by a user (the manufacturer initially provides a default calibration factor) to compensate for external plumbing and pressure requirements for the user aquarium, vivarium, or terrarium installation. The calibration factor is used to offset manufacturing variance in the volume of the tubing 30 in the peristaltic pump 10. For this process, the user specifies a volume of liquid (such as in mL) to dispense and a dispensing rate (such as in mL/sec) to use while the outlet of the tubing 30 is placed into a graduated cylinder or other volumetric measuring device. The input end of the pump 10 is placed into a supply of liquid and the pump 10 then dispenses the specified volume at the given rate. The user observes the actual volume dispensed by the pump 10 using the graduated cylinder and inputs that actual volume into the controller 25. The controller 25 uses this actual volume to calculate and save a calibration factor for the tubing 30. This calibration factor is calculated using the following steps: first the controller 25 saves the parameters including a default calibration factor provided by the manufacturer or previous user determined calibration factor, the values from the first and second tables (see below), and the full number of rotations that are used to dispense the specified volume. The user then measures the volume dispensed by the pump 10 when the specified volume is entered, and enters that measured volume into the controller 25. Next, the actual volume dispensed, the saved values from the first and second tables, and the saved number of full rotations are used by the controller 25 in the calculation process described in paragraphs and below to back calculate the calibration factor. In the back calculation, the measured volume is used as $V_t$; and since the values from the first and second tables and the number of full rotations are known, the calibration factor can be calculated using the process described in paragraphs and below. This calibration factor is then saved in the controller 25 to be used for performing further dispensing actions as discussed below. This calibration process is recommended when the tubing 30 is changed or when altering other tubing connected to the input or outlet of the peristaltic pump 10. The pump 10 is initially provided with a default calibration factor by the manufacturer; however, it is recommended that the calibration process be initiated before the first dosing action.

The controller 25 takes into account any parking position advancement needed on account of tube deformation parking, throughout each rotation based on the first lookup table to complete the dispensing/dosing of a specified volume of liquid. Thus, when the motor 24 is stopped after dispensing fluid (random stop), the motor 24 is reversed to place the rollers 28 in the fixed parked position(s). The number of micro-steps required to reach that parked position are memorized by controller 25. At the beginning of the next dosing event, the same number of micro-steps are advanced before the next dosing begins. In this way, the pump 10 advances the rollers 28 from the parked position to the terminus of the previous dosing event, so that thereafter the next dosing event can commence and an accurate volume of liquid dispensed.

Current aquarium metering pumps operate at a small number of finite flow rates in order to maintain acceptable accuracy levels without the above-mentioned complexities. Contrary to typical aquarium metering pumps, the motor controller 25 of the peristaltic metering pump 10 performs the above-mentioned calculations and includes a second flow rate lookup table. This second table contains multiplication factors for different motor speeds. It was observed during testing that the volume dispensed varied from expectations based on the flow rate or speed at which the motor 24 was rotating. It was determined that further measurements were needed to be taken to quantify this variation. The end result, from a number of automated dispensing actions and volume measurements form those dispensing actions, provided a table of multiplication factors referenced to a wide range of motor speeds that are used in calculating a dosing action by the controller 25. To generate the second table, volume measurements at different motor speeds are obtained over a specified number of rotations. Preferably, at least about 30 different motor speeds and volume measurements are effected to provide the second table. These volume measurements are then compared to the expected volume. The expected volume is obtained by multiplying the calibration factor by the specified number of rotations. Each of the multiplication factors provided in the second table is the ratio between the volume measured and the corresponding expected volume. Each of the multiplication factors is correlated to a flow rate (F) associated with the motor speed (F=motor speed (revolution/time)*calibration factor (volume/time)). This second table is unique to the pump 10, provided by the manufacturer, stored in the controller 25, and used for every dosing action.

A dosing action, as specified by the user, is a volume ($V_t$) to dose over a certain amount of time. From this specification, the flow rate (F, volume per time) can be determined. The flow rate (F) is used to determine a multiplication factor ($f_m$) from the second table. Multiplying the multiplication factor from the second table and the calibration factor ($f_c$ which is in volume per rotation) discussed previously results in the volume dispensed by the pump 10 per rotation of the motor 24. The product (volume per rotation) is used to determine the number of rotations (R) needed to dispense the bulk of the dosing volume specified by dividing the volume ($V_t$) by the product, $R=Vt/(f_m*f_c)$ (Equation 1). The integer of R is the number of full rotations the motor must operate to dispense the liquid. The volume obtained by the full rotations is referred to herein as $V_f=INT(R)*(f_m*f_c)$, where INT(R) is the integer of R. Since it would be very unlikely that the specified volume results in a whole number of full rotations (R), the partial rotation needed is calculated using the previously discussed first table to determine the number of steps necessary to provide the volume needed in the partial rotation. To do that, the volume associated with the partial rotation ($V_p$) is obtained by subtracting the volume obtained by the full rotations ($V_f$) from the volume entered by the user ($V_t$) ($V_p=V_t-V_f$). $V_p$ and the initial angle of the motor 24 are then used to look up, in the first table, the number of steps required to dispense $V_p$. Thus, to achieve the volume entered by the user ($V_t$), the motor 24 must rotate the number of full rotations plus the number of micro-steps obtained from the first table. The controller 25 is programmed to perform the calculations necessary to operate the motor 24 to provide the desired dosing action. Before this motion is started and after it is completed, the controller 25 also calculates any initial steps that do not dispense and any steps to the parking position after the motion.

Thus, the peristaltic metering pump 10 can operate at an extremely wide range of flow rate volumes with high accuracy. The peristaltic metering pump 10 is able to use a single point calibration value in addition to the internal flow rate lookup tables to calculate parameters to deliver (or pump) a specified amount of liquid in an exactly specified amount of time without having to round to the nearest fixed flow rate like typical metering pumps do. This allows the peristaltic metering pump 10 to add an additional feature: continuous dosing. Typical metering pumps dispense the liquid at a fixed rate until a volume target is reached and then pumping is stopped. For some additives or liquids, it is beneficial to be dispensed at a constant rate continuously, because the concentrated additive is not dispensed too quickly to increase concentration levels in an aquarium too quickly, for example. With continuous operation, the additive may be added as slowly as possible in order to maintain a relatively constant concentration of the additive. Existing pumps operate at discrete, fixed flow rates, sometimes one fixed flow rate, sometimes multiple fixed flow rates. These flow rates rarely provide the desired volume over 24 hours. For instance, if a user wants 500 mL of volume over 24 hours, that would equate to ~0.347 mL/minute flow rate. It would be unlikely that the existing pump would have that flow rate as a pre-programmed fixed flow rate available to use since they are implemented in a fixed method at design time. If that pump had 0.5 mL per minute as an available flow rate, the pump would dispense 720 mL in a 24 hour span, not the 500 mL that was desired. Conversely, the more likely outcome is that the pump would dispense the 500 mL, but only operate for 16.67 hours over the course of the day, not continuously. The previously mentioned volume multiplication factor versus flow rate table of measured values and its implementation allows the present pump to provide any possible flow rate as necessary to accurately dispense a desired volume over a full 24 hours Typical aquarium metering pumps use either synchronous or asynchronous DC motors (brushed or brushless) or DC stepper motors. Asynchronous DC motors are the least precise motors to use due to lack of fine feedback on position. Stepper motors are very loud due to their trapezoidal torque profile throughout their rotation, but stepper motors are very precise. The stepper motor 24 of the peristaltic metering pump 10 is not only very accurate, but also generates low audible noise to create a quiet stepper motor driven peristaltic pump. By using a 256,000 micro-step drive method for the motor controller 25, the trapezoidal torque profile is smoothed to a near sinusoidal drive current, thus reducing mechanical noise in the stepper motor 24.

The motor controller 25 controls the operation of the stepper motor 24 by selectively applying pulse width modulated (PWM) pulses to the stepper motor 24 to control the speed and/or torque of the stepper motor 24. The stepper motor 24 is driven with the PWM pulses to provide a micro-step drive current that is stepped for predetermined time intervals to provide an approximation of a sinusoid. The stepper motor 24 is energized by the PWM pulses to drive the pump rotor 22 in both forward (clockwise as illustrated in the figures) and reverse (counterclockwise as illustrated in the figures) directions.

A voltage mode PWM current regulator in the stepper motor 24 further reduces electrical noise in a motor stator, which is the most common audible noise in a stepper motor during operation. The standard constant current regulation method applies a constantly changing switching signal to the motor stator which causes the audible switching noise in a stepper motor. In voltage control PWM regulation, a fixed PWM signal is configured into the motor stator 18 to drive the appropriate current through the motor 24 without additional switching harmonics that create audible noise.

The following illustrates an example of a dosing operation of a pump 10 operable at 1000 steps/rotation with a calibration factor of 1.8 mL/rotation. Assume the user enters a volume ($V_t$) of 100 mL and a time (t) of 1 hour (3600 s). The controller first divides the volume by the time to obtain a flow rate (F) of 27.778 μL/s. The flow rate is then used to look up in the second table the multiplication factor to obtain a value of 0.96. Multiplying the multiplication factor and the calibration factor obtains a value of 1.728 mL/rotation. Dividing $V_t$ by that value (100 mL/1.728 mL/rotation) results in 57.87 rotations. The integer value, 57, indicates the number of full rotations required to dispense $V_f$ which is 98.496 mL (57 rotations×1.728 mL/rotations). The remaining volume $V_p$ is 1.504 mL (100 mL-98.496) which must be accounted for by looking up the first table to determine the number of steps needed to provide $V_p$ at the particular starting angle of the motor 24. The first table gives 849 steps to provide $V_p$. Therefore, to dispense $V_t$, the motor 24 must operate 57 full rotations and an additional 849 steps, or 57,849 steps (57 rotations×1000 steps/rotation+849 steps). Once the 57,849 steps are completed, the angular position of motor 24 (before reversing) is memorized by the controller 25 for the next dosing action. Additionally, the motor 24 reverses to place the rollers in the parking position. The number of steps the motor operates in reverse is also memorized by the controller 25 for the next dosing action. In the case of a pump 10 containing three rollers 28 placed 120° apart, the motor 24 would reverses 182 steps (849 steps−667 steps (the 667 step is the closest parking position for the rollers in the 3-rollers configuration)). The next dosing action would add 182 steps to account for the steps that were reversed in the immediate prior dosing action. All of the calculations required for the dosing operation, including the parking of the roller positions and the forwarding of the rollers prior to dosing are performed by the controller 25 using its software and firmware.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A peristaltic metering pump for aquariums, vivariums and terrariums, the peristaltic metering pump comprising:

a. an inlet port;

b. an outlet port;

c. a stator having an internal surface;

d. a flexible tube having an inlet end connected to the inlet port, and an outlet end connected to the outlet port;

e. a rotor comprising a roller carrier and a plurality of equiangularly disposed rollers rotatably mounted to the roller carrier, a portion of the flexible tube is compressed between at least two rollers and the internal surface, the rollers having a plurality of equiangularly disposed park positions;

f. a stepper motor configured to rotate the pump rotor; and g. a controller operably connected to the motor and configured to advance the rotor from a known park position during a dosing event in order to dispense a specified volume, the controller determining the number of steps of the stepper motor to dispense the specified volume, and to reverse the motor a number of steps to return at least one of the rollers to one of the plurality of park positions after completion of the dosing event.

2. The pump of claim 1, wherein the flexible tube is positioned within the stator between the internal surface and the rotor.

3. The pump of claim 1, wherein the roller carrier comprises a flat plate having a center fixed to a motor shaft of the motor.

4. The pump of claim 1, wherein the controller is further configured to track the number of steps the motor runs in reverse and to store in a memory the number of steps.

5. The pump of claim 4, wherein the controller is configured to forward the motor the number of stored steps before starting a metering cycle.

6. The pump of claim 1, wherein the dosing event comprises a plurality of dosing events and the controller is configured to commence each dosing event at one of the park positions.

7. The pump of claim 1, wherein the controller is configured to reverse the motor and position the rotor so at least one of the rollers is at a predefined park position after the dosing event.

8. The pump of claim 7, wherein the number of park positions is equal to the number of rollers.

9. The pump of claim 1, wherein the controller includes a lookup table that correlates volume to be dosed with the number of steps of the stepper motor.

10. The pump of claim 1, wherein the controller is configured to operate the stepper motor by microstepping.

11. The pump of claim 1, wherein the controller outputs pulse width modulated control pulses to the stepper motor.

12. A peristaltic metering pump for aquariums, vivariums and terrariums, comprising:

a. housing, the housing including an inlet port, an outlet port, and a stator having an internal surface;

b. a flexible tubing having an inlet end connected to the inlet port and an outlet end connected to the outlet port, at least a portion of the tubing juxtaposed to the internal surface;

c. a rotor comprising a roller carrier having a plurality of equiangularly disposed arms, each arm has a roller rotatably mounted thereto, a portion of the tubing is compressed between at least one roller and the internal surface;

d. a stepper motor operably connected to the pump rotor; and e. a controller operably connected to the motor and configured to advance the rotor from a known park position during each one of a plurality of dosing events in order to dispense a specified volume from the tubing and to reverse the motor and return the rollers to the known park position after completion of each dosing event.

13. The pump of claim 12, wherein the controller is further configured to track the number of steps the motor runs in reverse and to store in memory the number of steps.

14. The pump of claim 13, wherein the controller is configured to forward the motor the number of stored steps before starting a metering cycle.

15. The pump of claim 12, wherein the controller is configured to reverse the motor and position the rotor so at least one of the rollers is at the known park position after each dosing event, and wherein the number of park positions equals the number of arms.

16. The pump of claim 12, wherein the controller is configured to operate the stepper motor by microstepping.

17. The pump of claim 16, wherein the controller outputs pulse width modulated control pulses to the stepper motor.

18. The pump of claim 17, wherein the controller is further configured to track the number of steps the motor runs in reverse and to store in a memory the number of steps, and wherein the controller is configured to forward the motor the number of stored steps before starting each dosing event.

19. The pump of claim 1, wherein the pump is operably associated with one of an aquarium, vivarium and terrarium.

20. The pump of claim 12, wherein the pump is operably associated with one of an aquarium, vivarium and terrarium.

* * * * *